United States Patent
Schwartz et al.

(10) Patent No.: US 10,042,467 B2
(45) Date of Patent: Aug. 7, 2018

(54) INTEGRATED CAPACITIVE FINGERPRINT SENSOR

(71) Applicant: Synaptics Incorporated, San Jose, CA (US)

(72) Inventors: Adam L. Schwartz, San Jose, CA (US); Paul Wickboldt, Walnut Creek, CA (US); Guozhong Shen, San Jose, CA (US); Patrick Smith, San Jose, CA (US); Marc Ostrowski, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 127 days.

(21) Appl. No.: 15/199,851

(22) Filed: Jun. 30, 2016

(65) Prior Publication Data
US 2017/0220182 A1    Aug. 3, 2017

Related U.S. Application Data

(60) Provisional application No. 62/289,047, filed on Jan. 29, 2016.

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0416; G06F 3/0412; G06F 3/041; G06F 3/03547; G06F 3/044; G06K 9/00013; G06K 9/00006; G06K 9/00; G06K 5/00; G06K 2300/0413; G06K 2300/0404; G06K 2300/04; G06K 2300/023;
(Continued)

(56) References Cited

U.S. PATENT DOCUMENTS

| 7,734,074 B2 | 6/2010 | Setlak et al. |
| 8,564,314 B2 * | 10/2013 | Shaikh ................. G06K 9/0002 324/658 |

(Continued)

FOREIGN PATENT DOCUMENTS

| KR | 20140046888 | 4/2014 |
| KR | 101432988 B1 | 8/2014 |
| KR | 101474733 B1 | 12/2014 |

*Primary Examiner* — Julie Anne Watko
(74) *Attorney, Agent, or Firm* — Leydig, Voit & Mayer, Ltd.

(57) ABSTRACT

An input device includes a first sensor array having a first plurality of sensor electrodes disposed in a sensing area, wherein the first sensor array has a first pixel density, and a second sensor array having a second plurality of sensor electrodes disposed in the sensing area, wherein the second sensor array has a second pixel density different from the first pixel density. The input device also includes a processing system coupled to the second plurality of sensor electrodes and configured to electrically float a sensor electrode in the second plurality of sensor electrodes during a sensing period of the first sensor array.

22 Claims, 9 Drawing Sheets

(51) Int. Cl.
*G06K 9/00* (2006.01)
*G09G 5/10* (2006.01)
*G06F 3/0354* (2013.01)

(52) U.S. Cl.
CPC ............ *G06K 9/0002* (2013.01); *G09G 5/10* (2013.01); *G06F 3/03547* (2013.01); *G09G 2300/0413* (2013.01); *G09G 2300/0447* (2013.01)

(58) Field of Classification Search
CPC ............ G06K 2300/00; G06K 9/0002; G06K 9/00026; G09G 5/10; G09G 2300/0447; G09G 2300/0413; G09G 2300/0404; G09G 2300/04; G09G 2300/023; G09G 2300/00
See application file for complete search history.

(56) References Cited

U.S. PATENT DOCUMENTS

| | | | |
|---|---|---|---|
| 8,638,107 B2* | 1/2014 | Schwartz | G06F 3/0416 324/658 |
| 8,653,834 B2* | 2/2014 | Reynolds | G06F 3/044 324/658 |
| 9,158,958 B2 | 10/2015 | Wickboldt et al. | |
| 9,274,553 B2 | 3/2016 | Erhart et al. | |
| 9,349,035 B1* | 5/2016 | Gerber | G06K 9/00013 |
| 9,400,911 B2 | 7/2016 | Erhart et al. | |
| 9,460,332 B1* | 10/2016 | Bussat | G06F 3/041 |
| 2007/0109239 A1* | 5/2007 | den Boer | G02F 1/13338 345/87 |
| 2009/0067684 A1 | 3/2009 | Mainguet | |
| 2009/0236151 A1 | 9/2009 | Yeh et al. | |
| 2011/0102567 A1 | 5/2011 | Erhart | |
| 2011/0102569 A1 | 5/2011 | Erhart | |
| 2013/0135247 A1* | 5/2013 | Na | G06F 21/32 345/174 |
| 2014/0300574 A1 | 10/2014 | Benkley, III et al. | |
| 2015/0177884 A1* | 6/2015 | Han | G06F 3/044 345/174 |
| 2015/0185983 A1* | 7/2015 | Yang | G06F 3/03547 345/173 |
| 2015/0227233 A1 | 8/2015 | Yi et al. | |
| 2015/0378481 A1 | 12/2015 | Cok | |
| 2015/0378494 A1 | 12/2015 | Cok | |
| 2016/0350571 A1* | 12/2016 | Han | G06K 9/0002 |
| 2017/0068838 A1* | 3/2017 | Kravets | G06F 3/044 |
| 2017/0344166 A1* | 11/2017 | Nam | G02F 1/13338 |

* cited by examiner

INTEGRATED CAPACITIVE FINGERPRINT SENSOR

CROSS-REFERENCE TO RELATED APPLICATIONS

The present application claims the benefit under 35 U.S.C. § 119(e) of U.S. Provisional Application Ser. No. 62/289,047, filed Jan. 29, 2016, and titled "INTEGRATED CAPACITIVE FINGERPRINT SENSOR," which is hereby incorporated by reference in its entirety.

FIELD

This disclosure generally relates to touch sensitive display devices, and more particularly to touch sensitive display devices incorporating a fingerprint sensor.

BACKGROUND

Input devices including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines information regarding a touch event, such as the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensor devices are also often used in smaller computing systems (such as touch screens integrated in mobile devices such as smartphones and tablets).

SUMMARY

Embodiments of the disclosure provide integrated fingerprint sensor structures overlying a touch sensor structure in a display of an electronic device, and methods of operating the same.

According to an embodiment, an input device is provided that includes a first sensor array having a first plurality of sensor electrodes disposed in a sensing area, wherein the first sensor array has a first pixel density, and a second sensor array having a second plurality of sensor electrodes disposed in the sensing area, wherein the second sensor array has a second pixel density different from the first pixel density. The input device also typically includes a processing system coupled to the second plurality of sensor electrodes and configured to electrically float a sensor electrode in the second plurality of sensor electrodes during a sensing period of the first sensor array.

According to another embodiment, an input device is provided that includes a touch sensor array comprising a plurality of touch sensor electrodes disposed in a touch sensing area, wherein the touch sensor array has a touch sensing pixel density, and wherein the touch sensing area is disposed in an active area of a display. The input device also typically includes a fingerprint sensor array comprising a plurality of fingerprint sensor electrodes disposed over the touch sensor electrodes in a portion of the touch sensing area, wherein the fingerprint sensor array has a fingerprint sensing pixel density higher than the touch sensing pixel density. The input device further typically includes sensor circuitry coupled to the fingerprint sensor array, wherein the sensor circuitry is configured to electrically float a fingerprint sensor electrode in the plurality of the fingerprint sensor electrodes of the fingerprint sensor during a touch position sensing time period, and drive sensing signals onto the plurality of the fingerprint sensor electrodes of the fingerprint sensor during a fingerprint sensing time period.

According to a further embodiment, a method is provided for operating an input device including a fingerprint sensor disposed in a touch sensing area. The method typically includes electrically floating a sensor electrode in a plurality of sensor electrodes of the fingerprint sensor during a touch position sensing time period, and driving sensing signals onto the plurality of sensor electrodes of the fingerprint sensor during a fingerprint sensing time period.

According to yet another embodiment, an input device is provided that includes sensor circuitry configured to couple to a fingerprint sensor array, wherein the fingerprint sensor array has a plurality of fingerprint sensor electrodes disposed in a touch sensing area. The sensor circuitry is configured to electrically float a fingerprint sensor electrode in the plurality of the fingerprint sensor electrodes of the fingerprint sensor during a touch position sensing time period, and drive sensing signals onto the plurality of the fingerprint sensor electrodes of the fingerprint sensor during a fingerprint sensing time period.

BRIEF DESCRIPTION OF THE SEVERAL VIEWS OF THE DRAWINGS

The embodiments will be described in even greater detail below based on the exemplary figures. The disclosure is not limited to the exemplary embodiments. The features described and/or illustrated herein can be used alone or combined in different combinations in the various embodiments of the disclosure. Further, features and advantages of various embodiments will become apparent by reading the following detailed description with reference to the attached drawings, which illustrate the following.

DETAILED DESCRIPTION

The following detailed description is exemplary in nature and is not intended to limit the invention or the application and uses of the invention. Furthermore, there is no intention to be bound by any expressed or implied theory presented in the preceding background, brief description of the drawings, or the following detailed description.

Figure 1:
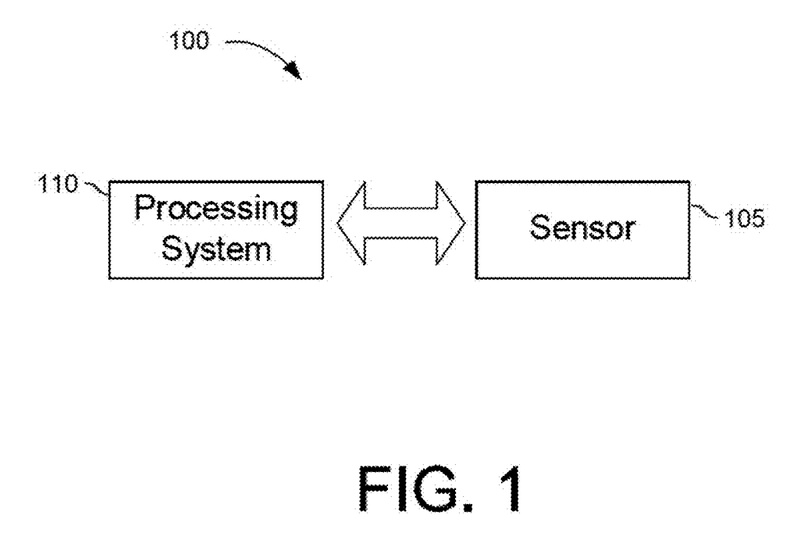
FIG. 1 is a block diagram of an exemplary input device according to an embodiment.

FIG. 1 is a block diagram of an exemplary input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 105 is included with the input device 100. The sensor 105 comprises one or more sensing elements configured to sense input provided by one or more input objects in a sensing region. Examples of input objects include fingers, styli, and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements. A sensor element may often be referred to as a pixel.

The input device 100 may utilize any suitable combination of sensor components and sensing technologies to detect user input in the sensing region. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the input device 100 may use resistive sensing techniques where contact from an input object closes an electrical circuit and can be used to detect input. In one exemplary technique, the sensor 105 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the input device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the input device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the input device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the input device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One exemplary technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another exemplary technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device and/or receiver circuitry configured to receive resulting signals with the sensing hardware. For example, a processing system for a mutual capacitance sensor device may comprise transmitter circuitry configured to transmit signals with one or more transmitter sensor electrodes of the sensor 105, and/or receiver circuitry configured to receive resulting signals with one or more receiver sensor electrodes of the sensor 105. As another example, a processing system for a self capacitance sensor device may comprise driver circuitry configured to drive absolute capacitance signals onto one or more sensor electrodes of the sensor 105, and/or receiver circuitry configured to receive resulting signals with the same or different sensor electrodes of the sensor 105. As a further example, a processing system for an ultrasonic sensor device may comprise driver circuitry configured to drive acoustic signals with ultrasonic transmitter elements, and/or receiver circuitry configured to receive signals with ultrasonic receiving elements. As a yet further example, a processing system for an optical sensor device may comprise driver circuitry configured to drive illumination signals to one or more LEDs or other light sources, and/or receiver circuitry configured to receive signals with optical receiving elements.

The processing system 110 may include electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
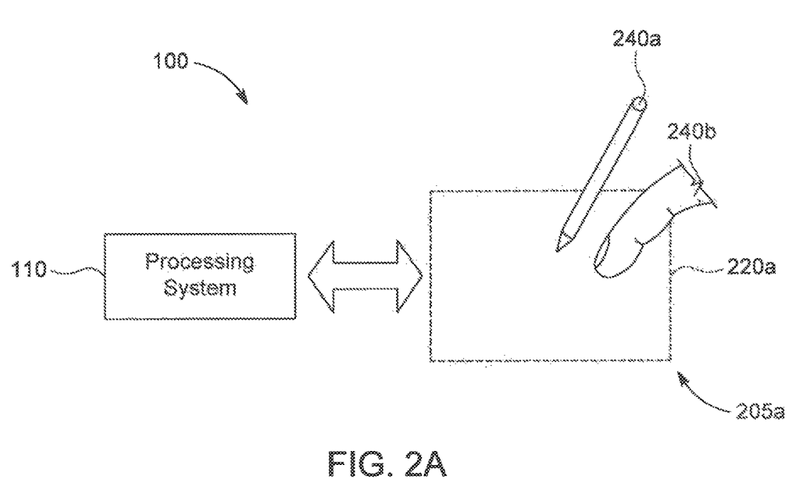
FIG. 2A is a block diagram of another exemplary input device according to an embodiment.
Figure 2B:
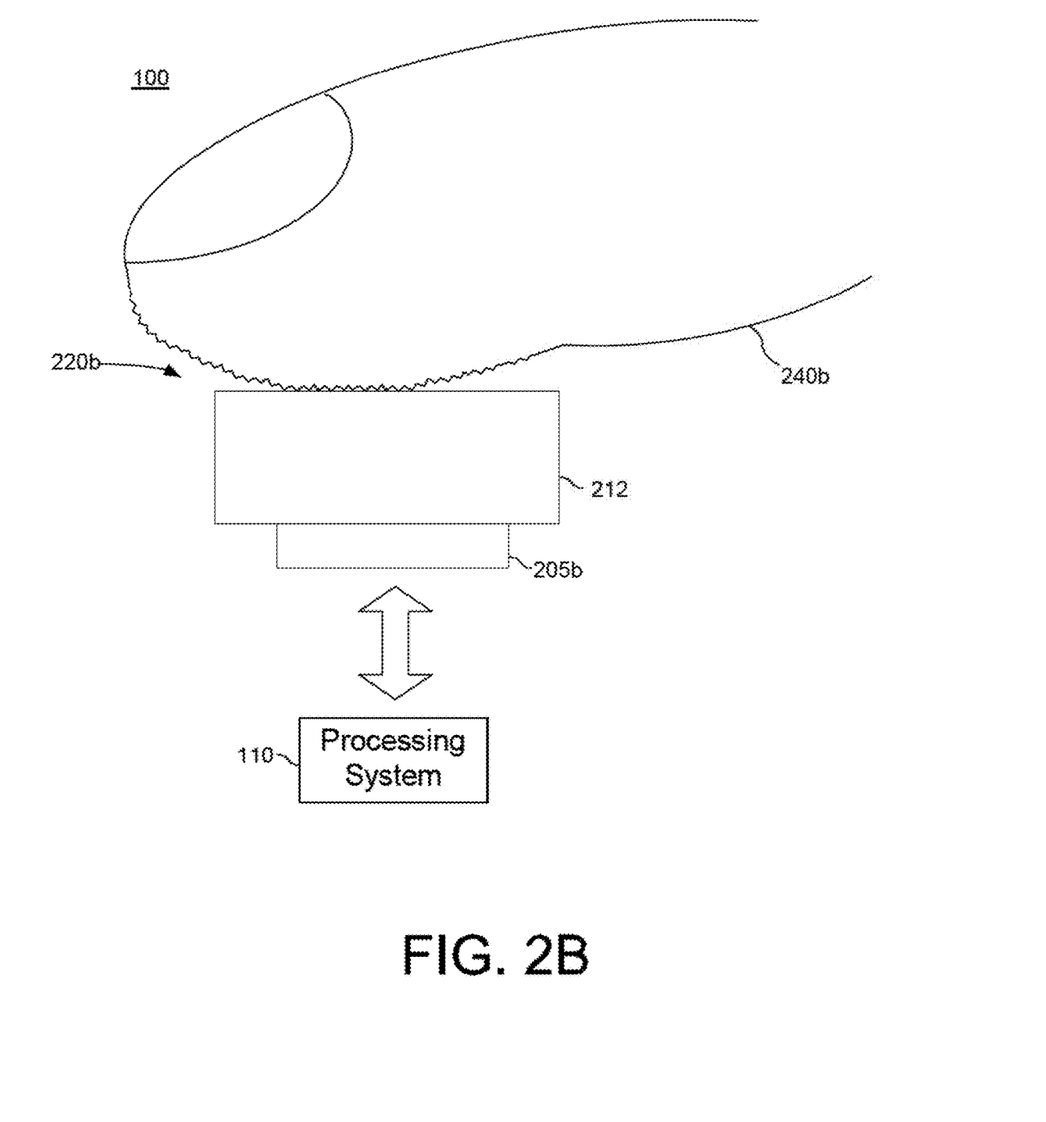
FIG. 2B is a block diagram of another exemplary input device according to an embodiment.

FIGS. 2A-2B depict further exemplary input devices 100. In FIG. 2A, the input device 100 is shown as including a touch sensor 205a. The touch sensor 205a is configured to detect position information of an input object within the sensing region 220a. The input object may include a finger 240b or a stylus 240a, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint image from a finger 240b. The sensor 205b is disposed underneath a cover layer 212 that provides an input surface for the fingerprint to be placed or swiped over the sensor 205b. The sensing region 220b may include an input surface with an area larger than, smaller than, or similar in size to a full fingerprint. The fingerprint sensor 205b has an array of sensing elements or pixels with a resolution configured to detect surface variations of the finger 240b, and the fingerprint sensor 205b has a higher resolution than the touch sensor 205a of FIG. 2A, e.g., a density of the fingerprint sensor pixels is greater than a density of the touch sensor pixels, or a pitch of the fingerprint sensor electrodes is smaller than a pitch of the touch sensor electrodes.

Figure 3A:
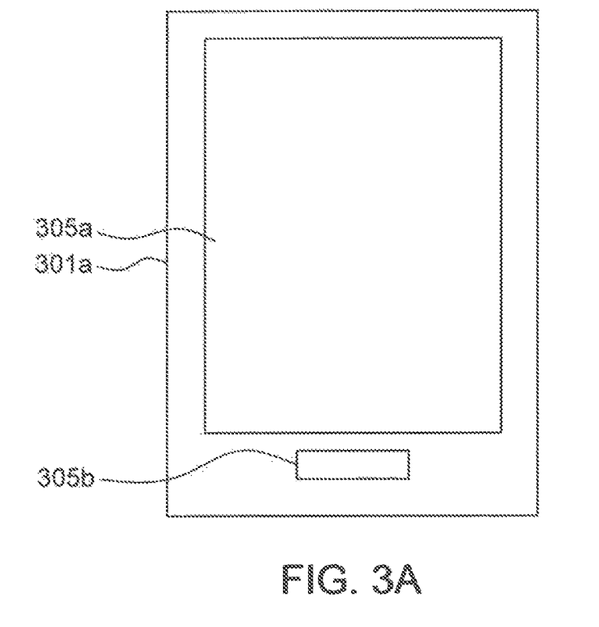
FIGS. 3A-3B are block diagrams illustrating exemplary electronic devices having both a touch screen interface and a fingerprint sensing interface according to embodiments.
Figure 3B:
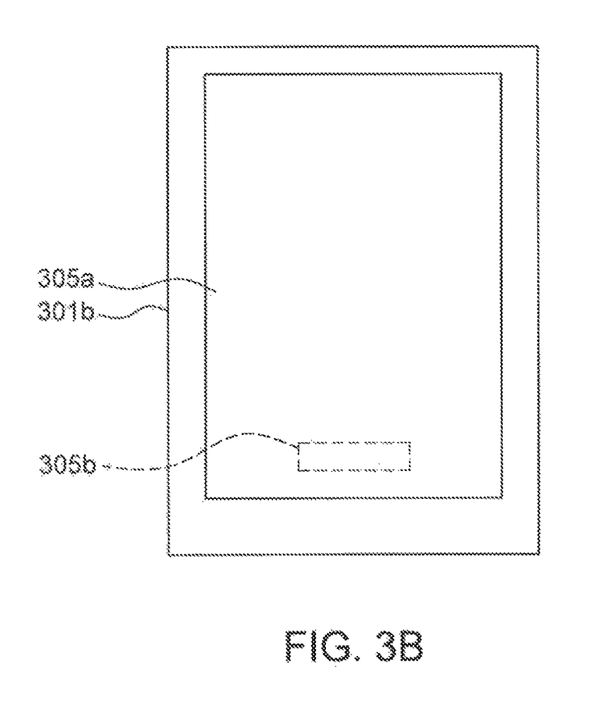

FIGS. 3A-3B are block diagrams illustrating exemplary electronic devices 301a and 301b having both a touch sensing interface and a fingerprint sensing interface. In FIG. 3A, the electronic device (e.g., a mobile device, such as a smartphone or tablet) 301a has a fingerprint sensor 305b that is separate from a touch sensor 305a (e.g., fingerprint sensor 305b is within a bezel of the electronic device 301a), such that the fingerprint sensing area (of the fingerprint sensor) is outside of the touch sensing area (of the touch sensor). In FIG. 3B, the electronic device 300b has a fingerprint sensor 305b that is integrated with the touch sensor 305a, such that the fingerprint sensing area is disposed within the touch sensing area.

Figure 4:
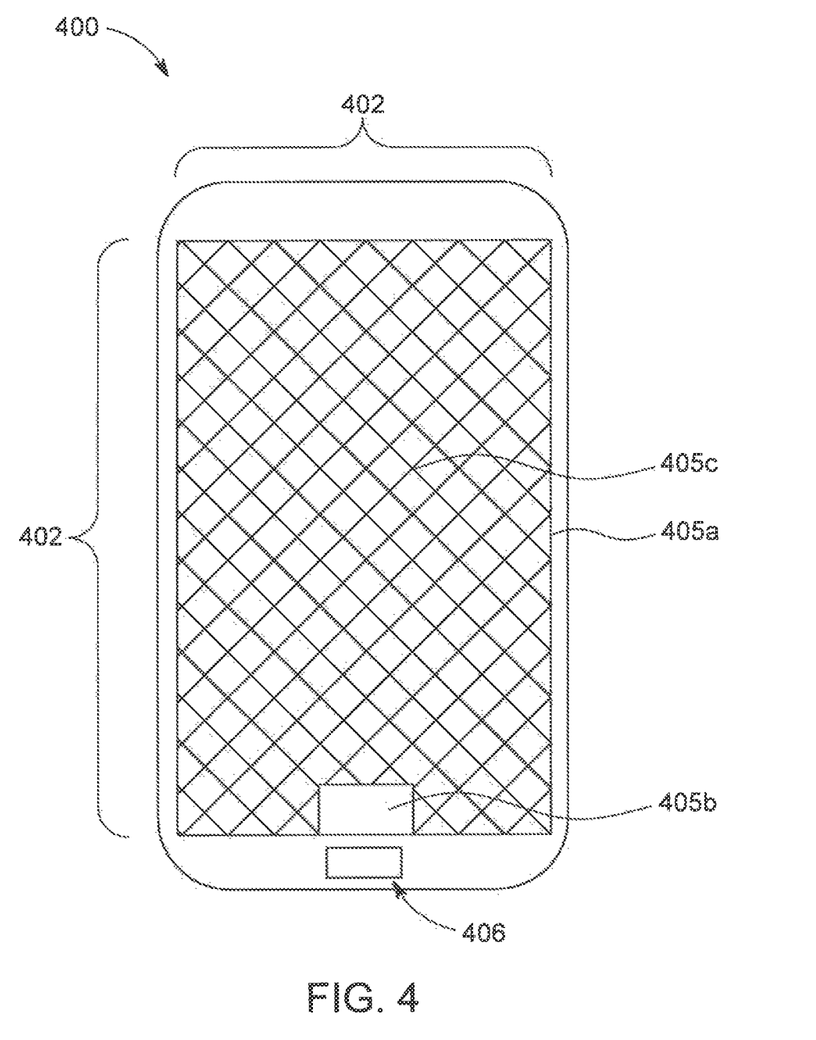
FIG. 4 is a block diagram of an exemplary electronic device having a capacitive fingerprint sensor in the lower portion of the active display area according to an embodiment.

FIG. 4 is a schematic diagram illustrating an exemplary electronic device 400 having a fingerprint sensor 405b in a peripheral portion of the active area 402 of a display. Fingerprint sensor 405b may be a capacitive fingerprint sensor. Fingerprint sensor 405b is disposed in the active area 402 above a portion of the touch sensor 405a. Routing (communication) lines, not shown, connect fingerprint sensor 405a with fingerprint sensor circuitry 406 (e.g., fingerprint sensor integrated circuit or fingerprint ASIC), which provides drive signals to operate fingerprint sensor 405a and processes resulting signals. Also shown are examples of touch sensor pixel elements 405c. The pixel elements 405c are not necessarily shown to scale nor in their actual shapes.

Positioning the fingerprint sensor within the display as shown in FIG. 4 allows for a narrower lower bezel as well as other interesting use cases enabled by having the fingerprint sensor in the active display area 402. Several issues related to providing an in-display capacitive sensor in the area of the touch sensing electrodes are addressed. Primary amongst the challenges are preventing disruption of the portion of the touch sensor 405a which is in the same area as the fingerprint sensor 405b or fingerprint sensor routing lines, and providing reasonable optical quality for the display.

Figure 5A:
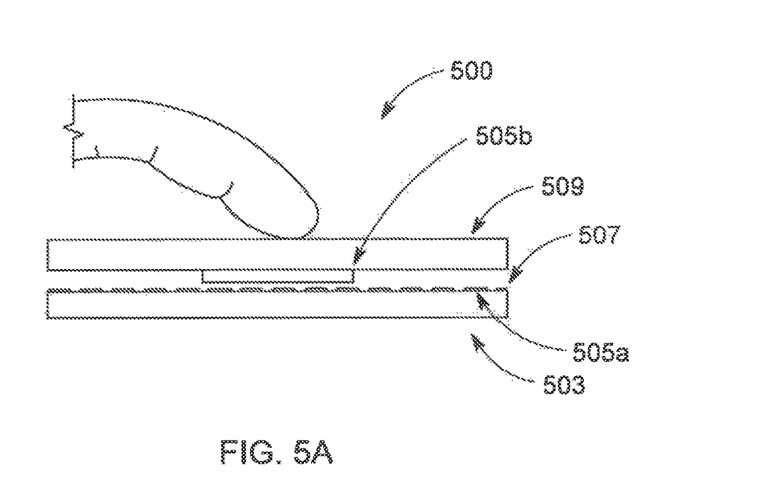
FIGS. 5A and 5B depict an exemplary stackup for a fingerprint sensor and touch sensor in a display according to an embodiment.
Figure 5B:
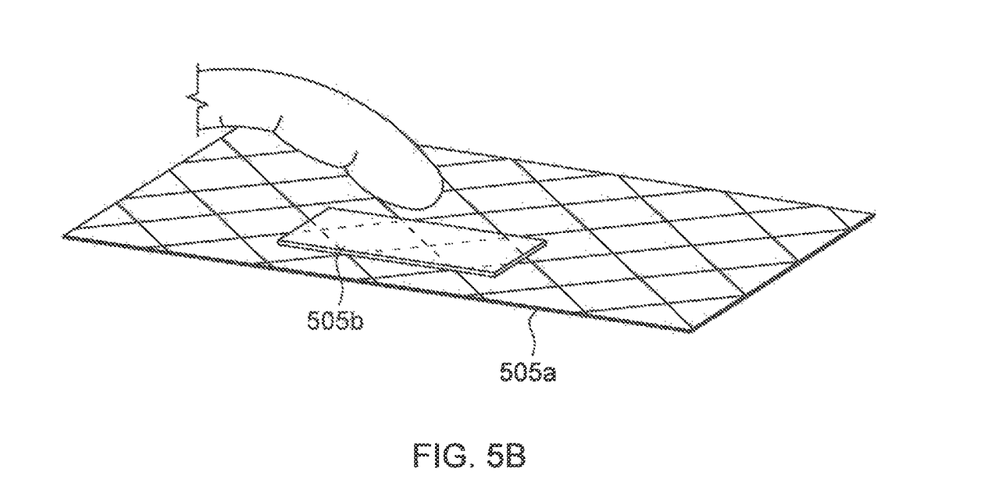

FIG. 5A and FIG. 5B show a closer view of a stackup which allows a fingerprint sensor (FPS) 505b to be placed inside the active display area of an electronic device 500, such as a mobile phone. The stackup shown in FIG. 5B places the FPS 505b at the bottom edge of the display 503 over the touch sensor 505a as shown in FIG. 4. A variety of stackups are possible where the capacitive sensor for fingerprint sensing or touch sensing is formed in the display (e.g., "in-cell"), on the display, on a flexible film substrate (e.g., PET), or on the cover glass itself (e.g., OGS), with the fingerprint sensor formed within the touch sensor area. An exemplary stackup shown in FIG. 5A includes the FPS 505b deposited onto the cover glass 509 and separated from the touch sensor 505a (which may be on a separate PET substrate or deposited on the display itself) by an optically clear adhesive (OCA) 507 or other dielectric. FPS 505b may be made from a combination of very thin (~2 μm) wires and conductive, transparent ITO. FPS 505b may be disposed on the underside of the top cover glass 509. The touch sensor 505a may be located on a layer beneath FPS 505b separated from it by a dielectric.

There are several challenges with this approach, including: 1) the FPS sensor is above a portion of the touch sensor and can lead to degraded or no touch performance in that area of the overlying touch sensor; 2) optical quality (the FPS sensor and its routing lines are not completely transparent and should preferably be designed to minimize their visibility); and 3) the routing and sensor time constants should be kept to a minimum in order to enable a high sensing frequency.

Touch Sensing in the FPS Area

Because the FPS includes conductive material (e.g., Rx and Tx electrodes), the FPS may act as a shield between the finger and the touch sensor. This degrades the touch performance of the touch sensor in the region of the FPS. Several steps can be taken to address this problem.

In an exemplary embodiment, the FPS may be made inactive while the touch sensor is in operation (i.e., during touch sensing time periods). The FPS may be active immediately after the electronic device (e.g., phone) is awoken, which is when the authentication event requiring use of the FPS is most likely to occur. Two exemplary modes are: 1) the electronic device is awoken by power switch activation or other physical activation such as a finger double-tap in the touch region, and if fingerprint security is enabled, then the FPS is activated and made ready for authentication; 2) the FPS is in an LPFD (low power finger detect) state when the electronic device is asleep, and LPFD (in response to a finger contact event being detected) wakes the electronic device and the FPS is made ready for authentication.

One exemplary technique is that when the FPS is inactive, or when the touch sensor is active, FPS electrode(s) are floated. One, several, or all of the FPS electrodes may be floated when the touch sensor is active, depending on the implementation and sensor layout. In the example shown in FIG. 5, all of the fingerprint sensor electrodes overlie a portion of the touch sensing area, and all of the FPS electrodes are floated during touch sensing. In this case, the FPS will act not as a shield but as a floating conductor. In other words, the sensor electrode(s) of the FPS are ohmically isolated during touch sensing time periods, while during fingerprint sensing time periods, sensing signals are sent to the FPS electrodes. This, by itself, advantageously allows touch detection (e.g., finger detection) by the touch sensor underneath.

Figure 6A:
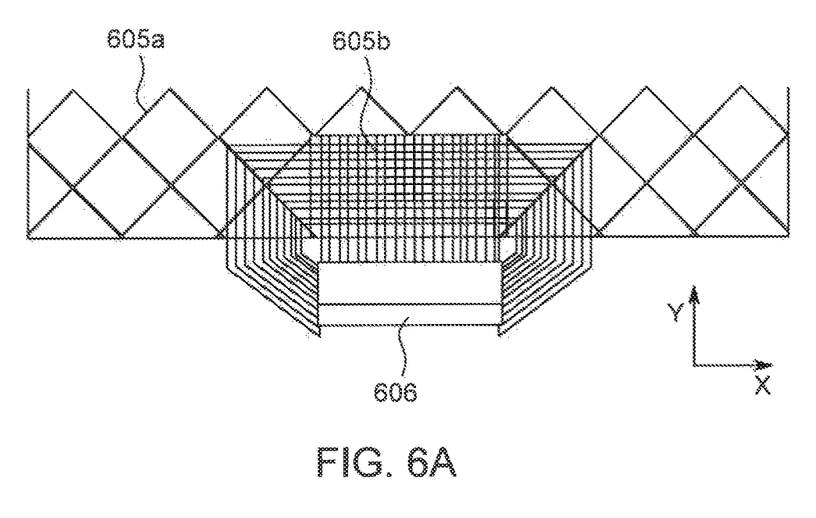
FIGS. 6A and 6B depict exemplary fingerprint sensors including routing and electrodes according to embodiments.
Figure 6B:
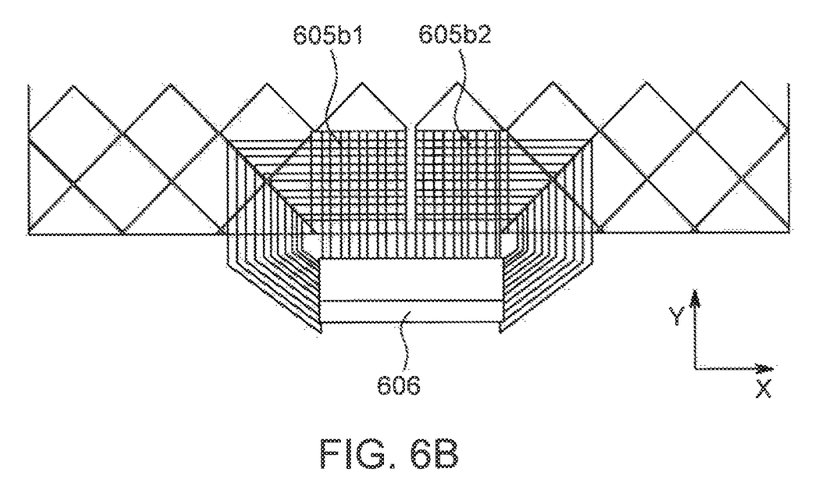

FIGS. 6A and 6B show a fingerprint sensor 605b overlying a portion of touch sensor 605a and including routing lines or wires connecting FPS electrodes with FPS IC 606 according to embodiments. FIG. 6A depicts an exemplary fingerprint sensor array 605b having an electrode pattern with a two-dimensional grid formed of rows and columns of sensor electrodes. The rows (horizontally oriented in the drawing) can be configured as transmitter electrodes and columns (vertically oriented in the drawing) can be configured as receiver electrodes arranged orthogonally to the transmitter electrodes, although the transmitter and receiver electrodes need not be orthogonal. During fingerprint sensing, the FPS IC drives sensing signals onto the transmitter electrodes and receives resulting signals from the receiver electrodes. In this orientation, this means that the receiver electrodes extend from the edge of the FPS IC 606 that is closest to the fingerprint sensing area, which minimizes the length of the path that the receiver signals travel to reach the FPS IC 606. However, it should be understood that the orientation of the transmitter and receiver electrodes can be reversed in other implementations.

The touch sensor array 605a also includes an electrode pattern with a two-dimensional grid formed of rows and columns of sensor electrodes, arranged in an interleaved diamond pattern in the illustrated configuration, but the touch sensor array has a lower pixel density than the fingerprint sensor array. One common-type of capacitive touch sensing is referred to as mutual- or transcapacitance sensing. In this technology, the rows of the touch sensor can be configured as transmitter electrodes and columns can be configured as receiver electrodes, or vice versa. During transcapacitive touch sensing, the touch sensor circuitry drives sensing signals onto each of the transmitter electrodes and receives resulting signals from each of the receiver electrodes. The touch sensor circuitry can be on a separate chip (not pictured) from the FPS IC 606 or integrated on the same chip. It should be appreciated that various touch sensor patterns are possible and the touch sensor need not use transcapacitive sensing to detect touch. By way of example, the touch sensor may use various matrix arrangements, single layer patterns, and it may use absolute capacitance (also called self-capacitance) sensing schemes. In self-capacitance techniques entire rows and columns can be measured (e.g. profile sensing) or individual pixels can be directly measured (e.g. matrix sensing).

During touch sensing, in the example of FIG. 6A the positional resolution of the touch sensor may be limited to the entire region of the FPS. So, for example, if the fingerprint sensor is 10 mm×4 mm, the touch accuracy in that region could be as poor as +/−5 mm (but it could be higher if some of the bordering touch pixels also respond to the touch event). Also, the ability to distinguish multiple touching objects over the region of the FPS may be impaired. In order to improve this situation, additional steps may be taken to create smaller floating islands within the FPS, which allow for smaller effective pitch to be supported by the touch sensor. This approach is demonstrated in the bottom example of FIG. 6B. In FIG. 6B, the sensor pattern includes a two dimensional grid having rows and columns of sensor electrodes, but the sensor pattern is divided into separate areas or distinct regions by ohmically insulating the different areas from one another.

In FIG. 6A, the exemplary fingerprint sensor 605b has a rectangular geometry (e.g., 10 mm×4 mm), and touch accuracy over the FPS is lower in the x-dimension than the FIG. 6B example even though the FPS is floated during touch operation. As can be seen in FIG. 6B, the rows of sensor electrodes are cut down the middle to achieve this separation (e.g., an insulator material resides between the two separate areas). This creates two separate floating islands $605b_1$ and $605b_2$ (e.g., each having a dimension of 5 mm×4 mm) resulting in much improved touch location finger accuracy for the touch sensor below the FPS. As indicated in FIG. 6B, the electrodes disposed in the x-axis directions (whether they are TX or RX electrodes) may be separated in the middle to provide electrical isolation between the left and right halves of the sensor. For a 10 mm×4 mm sensor, for example, this breaks the sensor into two separate 5 mm×4 mm floating islands $605b_1$ and $605b_2$. This prevents the FPS from spreading the touch signal across its entire length (e.g., 10 mm along the x-direction) and can greatly improve touch accuracy in that region. It should be appreciated that the FPS may be divided into more than two electrically isolated, floating islands.

Reducing Optical Artifacts in the FPS Region while Maintaining Low Routing Time-Constants If the routing to the FPS is in the active display area, optical artifacts (e.g., Moiré patterns and reduced optical transmission leading to reduced brightness) may occur. In order to minimize these effects while also maintaining low routing time-constants and minimal interference to the performance of the underlying touch sensor, additional floating lines or wires may be added, as shown in FIG. 7.

Figure 7:
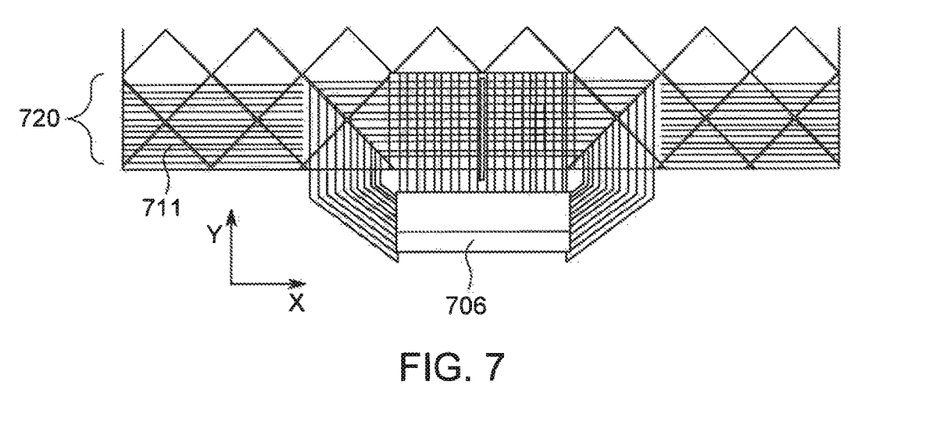
FIG. 7 depicts metal routing and cuts to provide low-distance (low-resistance) routing, optical uniformity and prevent interference of touch performance according to an embodiment.

In FIG. 7, the routing to the vertical electrodes (along the y-axis) is directed immediately down to the FP IC 706, and is mostly not in the display area. The routing to the horizontal electrodes (rows), in certain aspects, is made as short as possible and directed downwards to the FP IC 706 as compactly as possible. This side routing overlays a different portion of the touch sensor and may also affect touch performance. The side routing may, therefore, be minimized. In one embodiment, additional, unconnected routing lines or wires 711 (e.g., thin metal wires) are extended to the edges (left and right edges) of the display, and over a portion of the touch sensor, to make the optical impact of the connected routing lines more uniform and, thus, less visually noticeable. The unconnected routing lines 711 are floating. In certain aspects, additional cuts in the unconnected routing lines 711 are provided along the sensor pattern of the touch sensor underneath to prevent touch coupling from being spread across underlying touch pixels by the floating conductors. For example, in an embodiment, the plurality of electrically floating routing lines are arranged in a pattern that substantially matches a pattern of the portion of the touch sensor array over which these routing lines are present. In other words, this routing scheme may include dummy wires (unconnected routing lines 711), and these dummy wires may be ohmically separated from each other over different touch electrodes.

With this routing scheme, the bottom portion, e.g., 4 mm or so, of the display may be dimmer than the rest of the display area due to the presence of the routing lines (connected routing lines only or connected routing lines with non-connected dummy lines). In one embodiment, the brightness of the display may be increased, e.g., by a display driver coupled with the display, by some amount in this region to compensate for the reduced brightness and to make the overall brightness more uniform, while not unduly increasing the power consumption of the display. This may be accomplished for an OLED display, for example, by increasing the diode current in this lower region of the display. The brightness may be increased in the fingerprint sensing area, fingerprint routing area, an area containing unconnected floating wires, or some combination thereof, relative to a remainder of the display area.

In certain aspects, additional non-connected wires may be placed over the entire area of the display to improve the overall optical uniformity of the display, for example, if the border between the lower fingerprint-enable section and the rest of the display become too visible, e.g., when the display is tilted up or down while viewing; this would eliminate the appearance of a bright line in the display that may be visible when the display is tilted toward the user (the metal patterns no longer dim the uppermost brightened region) or away from the user (when the uppermost metal patterns then overlap the dimmer larger portion of the display. A gradient in the OLED display brightness traversing this border may also be used to reduce the visibility of this border.

Although the patterns of the non-connected routing lines (e.g., thin metal wires) are shown as straight lines in FIG. 7, exemplary implementations may use line patterns having lines at other non-normal angles (which may include wavy or zig-zag patterns) that depend on the display's color subpixel layouts to reduce the tendency of these lines to produce Moiré patterns and color patterns in the display. Such optical artifacts can appear as the display viewing angle is tilted, as the routing wires may overlap different sets of display color subpixels, depending on the viewing angle.

In certain aspects, the effective electrical/capacitor line widths of the TX and RX lines may be increased by combining the metal TX/RX lines with wider strips of a transparent conducting material such as ITO. Employing wider RX or TX lines (in particular) may substantially improve the fingerprint sensor's sensitivity to the finger ridges and valleys.

Figure 8:
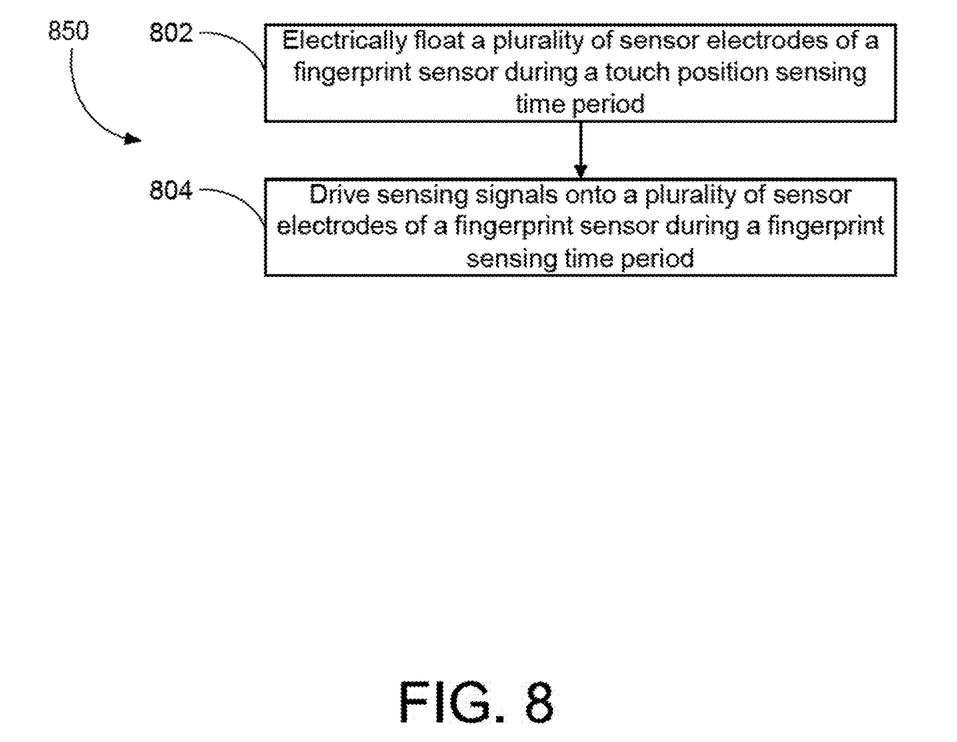
FIG. 8 is a flowchart illustrating an exemplary method for sensing finger input according to an embodiment.

An exemplary method 850 of operating a fingerprint sensor according to an embodiment is depicted in FIG. 8. At step 802, a processing system electrically floats a plurality of sensor electrodes of a fingerprint sensor during a touch sensing time period. For example, the FP IC 606 of FIG. 6 electrically floats the connected electrodes of FPS 605b during periods of time when the touch sensor 605a is active or in use. At step 804, a processing system drives sensing signals onto a plurality of sensor electrodes of a fingerprint sensor during a fingerprint sensing time period. For example, the FP IC 606 of FIG. 6 drives the connected electrodes of FPS 605b during periods of time when the FPS sensor 605b is active or in use and detects resulting signals. The steps 802 and 804 may occur in any order. In an embodiment, the method also includes increasing (e.g., via a display driver) a brightness of a portion of a display underlying the FPS and routing lines (e.g., connected routing lines and, if present, electrically floating routing lines) relative to the remainder of the display so that the entire display appears uniformly bright.

While the forgoing description includes examples particularly advantageous for integrating fingerprint sensors with touch screen sensors in the active area of a display, the above techniques may also be used to integrate fingerprint sensors with opaque touch pad sensors. Also, the above techniques may be used to integrate other types of sensors having different resolutions, beyond just sensors configured to detect fingerprint patterns and touch locations.

It should be understood that while certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 110). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments are described herein, including the best mode known to the inventors for carrying out the embodiments. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, the invention and disclosed embodiments include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
   a first sensor array comprising a first plurality of sensor electrodes disposed in a sensing area, wherein the first sensor array has a first pixel density;
   a second sensor array comprising a second plurality of sensor electrodes disposed in the sensing area, wherein the second sensor array has a second pixel density different from the first pixel density; and
   a processing system coupled to the second plurality of sensor electrodes and configured to electrically float a sensor electrode in the second plurality of sensor electrodes during a sensing period of the first sensor array.

2. The input device of claim 1, wherein the second plurality of sensor electrodes is disposed above the first plurality of sensor electrodes.

3. The input device of claim 1, wherein the second pixel density is higher than the first pixel density.

4. The input device of claim 1, wherein the second plurality of sensor electrodes includes a plurality of transmitter electrodes arranged orthogonally to a plurality of receiver electrodes to form a two-dimensional capacitive sensing grid, wherein the two-dimensional sensing grid is separated by an insulator into at least two distinct regions.

5. The input device of claim 4, wherein the processing system is configured to electrically float each of the at least two distinct regions.

6. The input device of claim 1, wherein the processing system is further configured to drive a sensing signal on a sensor electrode in the second plurality of sensor electrodes during a time period outside of the sensing period of the first sensor array.

7. The input device of claim 1, wherein the first sensor array comprises a touch sensor and
   wherein the second sensor array comprises a fingerprint sensor.

8. The input device of claim 7, wherein the second sensor array comprises a plurality of transmitter electrodes and a plurality of receiver electrodes forming a transcapacitive fingerprint sensing array.

9. The input device of claim 1, wherein the processing system is configured to electrically float all sensing electrodes in the second plurality of sensor electrodes during a sensing period of the first sensor array.

10. The input device of claim 1, further comprising:
    a plurality of routing lines connecting the processing system to the second sensor array, wherein the second sensor array is disposed above a first portion of the first sensor array, and
    wherein the plurality of routing lines are disposed above a second portion of the first sensor array.

11. The input device of claim 10, further comprising:
    a plurality of unconnected lines disposed over a third portion of the first sensor array proximal to the second portion of the first sensor array.

12. The input device of claim 11, wherein the plurality of unconnected lines are arranged in a pattern that substantially matches a sensor electrode pattern of the third portion of the first sensor array.

13. The input device of claim 12, wherein the first portion, second portion and third portion of the first sensor array together overlays only a first portion of a display of the input device.

14. The input device of claim 1, wherein the second sensor array is disposed above a first portion of a display, wherein a display driver is configured to increase a brightness of the first portion of the display relative to another portion of the display.

15. An input device, comprising:
    a touch sensor array comprising a plurality of touch sensor electrodes disposed in a touch sensing area, wherein the touch sensor array has a touch sensing pixel density, wherein the touch sensing area is disposed in an active area of a display;
    a fingerprint sensor array comprising a plurality of fingerprint sensor electrodes disposed over the touch sensor electrodes in a portion of the touch sensing area, wherein the fingerprint sensor array has a fingerprint sensing pixel density higher than the touch sensing pixel density; and sensor circuitry coupled to the fingerprint sensor array, wherein the sensor circuitry is configured to:

electrically float a fingerprint sensor electrode in the plurality of the fingerprint sensor electrodes of the fingerprint sensor during a touch position sensing time period; and drive sensing signals onto the plurality of the fingerprint sensor electrodes of the fingerprint sensor during a fingerprint sensing time period.

16. The input device of claim 15, wherein the plurality of fingerprint sensor electrodes includes a plurality of transmitter electrodes arranged orthogonally to a plurality of receiver electrodes to form a two-dimensional capacitive sensing grid, wherein the two-dimensional sensing grid is separated by an insulator into at least two distinct regions, wherein the sensing signals are driven onto the plurality of transmitter electrodes, and wherein the sensor circuitry is further configured to receive resulting signals from the plurality of receiver electrodes while the sensing signals are being driven onto the plurality of transmitter electrodes.

17. The input device of claim 16, wherein the sensor circuitry is configured to electrically float each of the at least two distinct regions.

18. The input device of claim 15, further comprising a cover lens layer overlaying the fingerprint sensor and the touch sensor.

19. The input device of claim 15, further comprising an optically clear adhesive material between the touch sensor and the fingerprint sensor.

20. The input device of claim 15, wherein the plurality of touch sensor electrodes has a first pitch that is greater than a second pitch of the plurality of fingerprint sensor electrodes.

21. A method of operating an input device comprising a fingerprint sensor disposed in a touch sensing area, the method comprising:

electrically floating a sensor electrode in a plurality of sensor electrodes of the fingerprint sensor during a touch position sensing time period; and driving sensing signals onto the plurality of sensor electrodes of the fingerprint sensor during a fingerprint sensing time period.

22. An input device, comprising:

sensor circuitry configured to couple to a fingerprint sensor array, the fingerprint sensor array having a plurality of fingerprint sensor electrodes disposed in a touch sensing area, wherein the sensor circuitry is configured to:

electrically float a fingerprint sensor electrode in the plurality of the fingerprint sensor electrodes of the fingerprint sensor during a touch position sensing time period; and drive sensing signals onto the plurality of the fingerprint sensor electrode of the fingerprint sensor during a fingerprint sensing time period.

\* \* \* \* \*